United States Patent
Francis et al.

[11] Patent Number: 6,007,345
[45] Date of Patent: Dec. 28, 1999

[54] DAMPER AND ELECTRICAL CONNECTION SYSTEM

[75] Inventors: Michael E. Francis, Beaver Falls, Pa.; Kathleen D. Murphy, Girard, Ohio; John David Fehring, Waynesville, Ohio; Tad Vincent Machrowicz, Kettering, Ohio; Frank M. Robinson, Centerville, Ohio; Steven Kent Raypole, Tipp City, Ohio

[73] Assignee: General Motors Corporation, Detroit, Mich.

[21] Appl. No.: 09/098,868

[22] Filed: Jun. 17, 1998

[51] Int. Cl.$^6$ .................................................... H01R 33/00
[52] U.S. Cl. .......................................... 439/34; 188/282.2
[58] Field of Search ............................... 439/34; 188/318, 188/282.2

[56] References Cited

U.S. PATENT DOCUMENTS 5,328,004  7/1994  Fannin et al. ............................ 188/318
5,454,585  10/1995  Dronen et al. ........................... 280/660
5,522,483  6/1996  Koch ..................................... 188/282.2
5,690,195  11/1997  Kruckemeyer et al. ................ 188/299

Primary Examiner—Michael L. Gellner
Assistant Examiner—Briggitte Hammond
Attorney, Agent, or Firm—Patrick M. Griffin

[57] ABSTRACT

A damper and electrical connector system wherein the damper includes a ring mounting element having a base portion attached to a housing of the damper and a hole extending through the base portion and communicating with an interior chamber of the housing. A slot is formed through a side of the ring mounting element and communicates with the hole in the base. The electrical connector includes an end inserted through the slot and a power terminal extends through the hole formed in the base and makes electrical connection with an element requiring electrical power that is carried in the housing. Preferably the electrical connector also includes a ground terminal which makes electrical contact with the ring mounting element. A vehicle mounting rod is inserted through the ring mount to hold the connector in place.

17 Claims, 4 Drawing Sheets

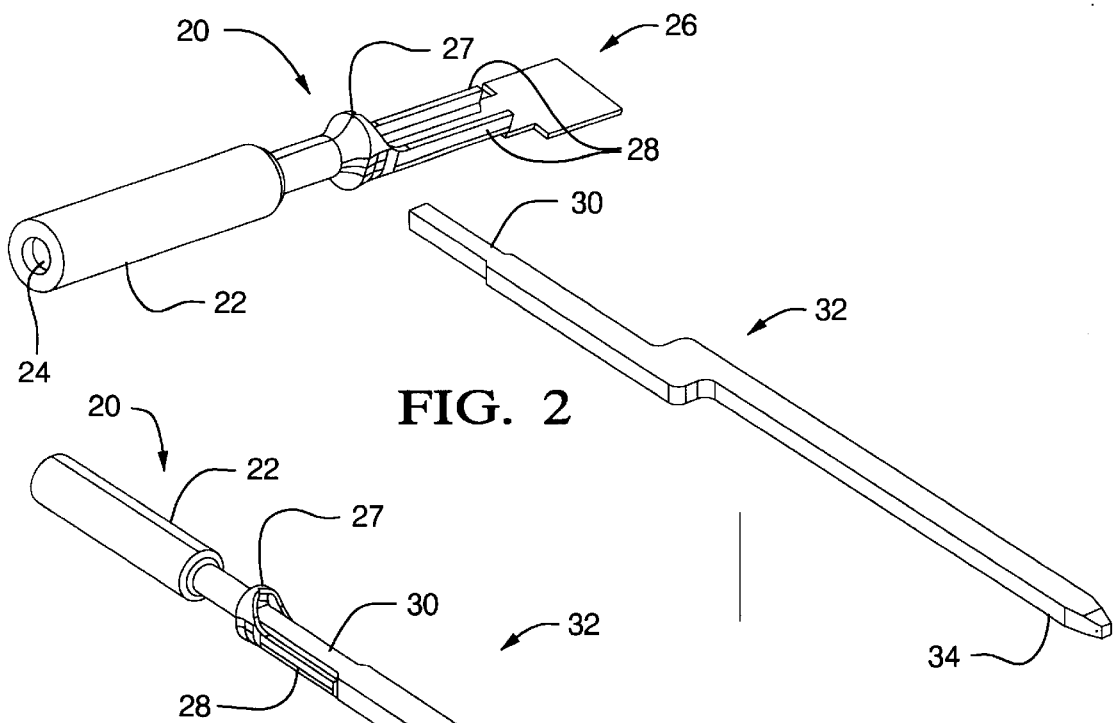
FIG. 2
FIG. 3
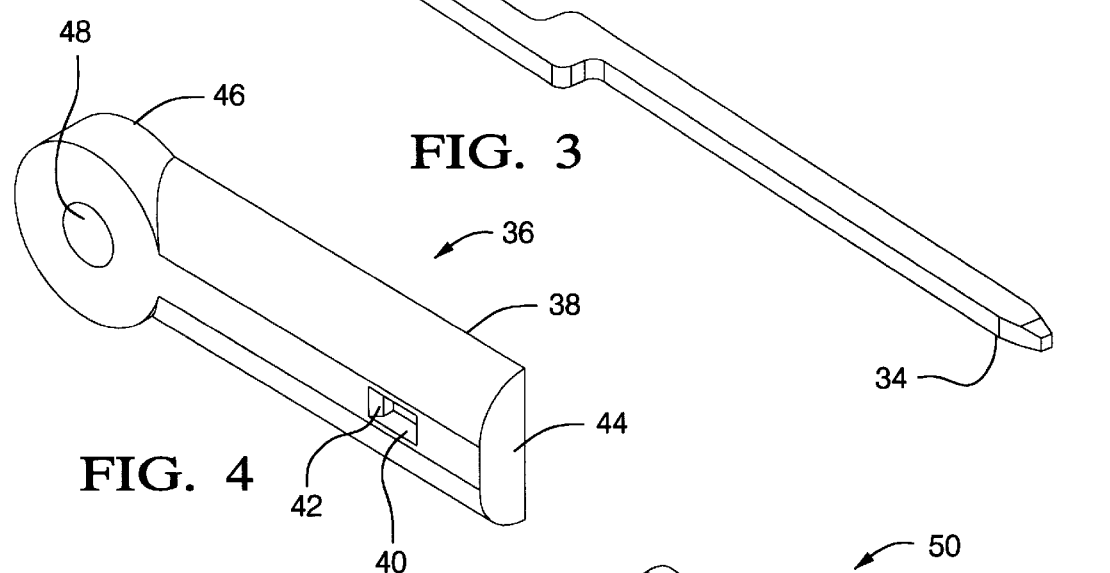
FIG. 4
FIG. 5
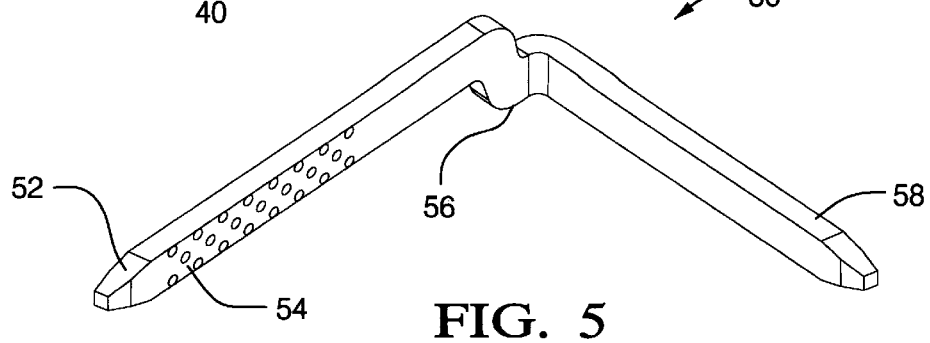

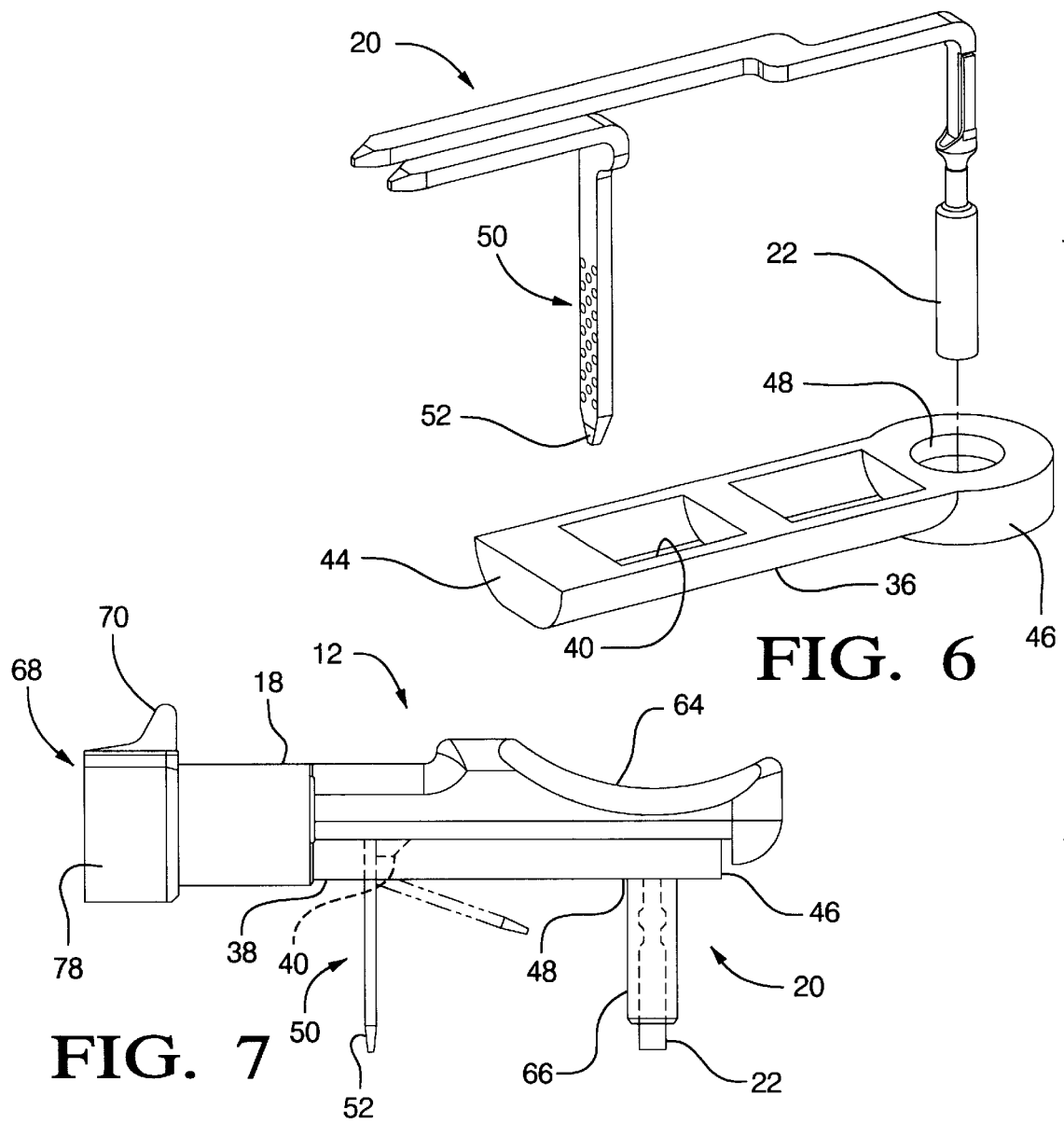

DAMPER AND ELECTRICAL CONNECTION SYSTEM

TECHNICAL FIELD

This invention relates to dampers, such as shock absorbers, and electrical connection systems for supplying electrical power to an element in the damper.

BACKGROUND OF THE INVENTION

Heretofore, it has been known to provide a shock absorber with a piston rod connected to a dampening device carried in a housing. The piston rod may include a threaded end that is extended through an aperture formed in the body of the vehicle and a nut threaded onto the end to hold the shock absorber to the body. Such a system is disclosed in Dronen et al, U.S. Pat. No. 5,454,585, entitled "Strut Assembly with Bearing Axis Alignment", issued Oct. 3, 1995. Alternatively, a ring mount may be welded to the top of the shock absorber housing or dust cover for receiving a connecting rod extending therethrough and attached to the vehicle body. Such a system is disclosed in Fannin et al, U.S. Pat. No. 5,328,004, entitled "Bypass Valve Assembly for Hydraulic Damper" issued Jul. 12, 1994.

It has also been known to provide an electrically controlled shock where the shock body is used as ground and the shock rod as a positive lead. In some of such prior systems a sliding terminal is used on the shock piston, and a lead is provided that reaches out to the inside the shock housing and to provide ground. The terminal slides and wears on the same surface of the shock piston.

It has also a been known to provide vertical slots in the threaded end of a shock rod at a location below a mounting ring. Electrical leads are passed through the slot to make connection to a solenoid carried in the shock housing. This design greatly weakens the threaded connection at the mounting ring.

The present invention provides alternatives to and advantages over the prior art.

SUMMARY OF THE INVENTION

The invention includes a damper and electrical connector system wherein the damper includes a ring mounting element having a base portion attached to a housing of the damper and a hole extending through the base portion and communicating with an interior chamber of the housing. A slot is formed through a side of the ring mounting element and communicates with the hole in the base. The electrical connector includes an end inserted through the slot and a power terminal extends through the hole formed in the base and makes electrical connection with an element requiring electrical power that is carried in the housing. Preferably the electrical connector also includes a ground terminal which makes electrical contact with the ring mounting element. A vehicle mounting rod is inserted through the ring mount to hold the connector in place.

In a preferred embodiment, the electrical connector includes a power terminal having a barrel portion extending downwardly for receiving an electrode carried in a bore of a piston rod. A solenoid valve is connected to the electrode and may be opened and closed to vary the dampening of the shock absorber. The electrical connector includes a contoured surface (sickle or arcuate shaped) generally above the barrel of the power terminal. Once the barrel of the power terminal is engaged with the electrode, a ring sleeve is inserted into the ring mounting element and engages the contoured surface to force the barrel end of the power terminal firmly down on the electrode and to hold the electrical connector in a fixed relationship with the ring mounting element.

These and other objects, features and advantages of the present invention will become apparent from the following brief description of the drawings, detailed description, and appended claims and drawings.

BRIEF DESCRIPTION OF THE DRAWINGS

FIG. 2 is an exploded view of barrel terminal and male blade utilized in the electrical connector of FIG. 1;

FIG. 3 is an assembled view of the barrel terminal and male blade of FIG. 2;

FIG. 4 illustrates a compression seal utilized to make the electrical connector of FIG. 1;

FIG. 5 illustrates a ground terminal used in the electrical connector FIG. 1;

FIG. 6 is an exploded view of a power terminal, ground terminal and compression seal according to the present invention;

FIG. 7 is a side view of electrical connector of FIG. 1;

FIG. 8 is an exploded view of an electrical connector and female harness connector assembly useful in the present invention.

DESCRIPTION OF THE PREFERRED EMBODIMENT

Figure 1:
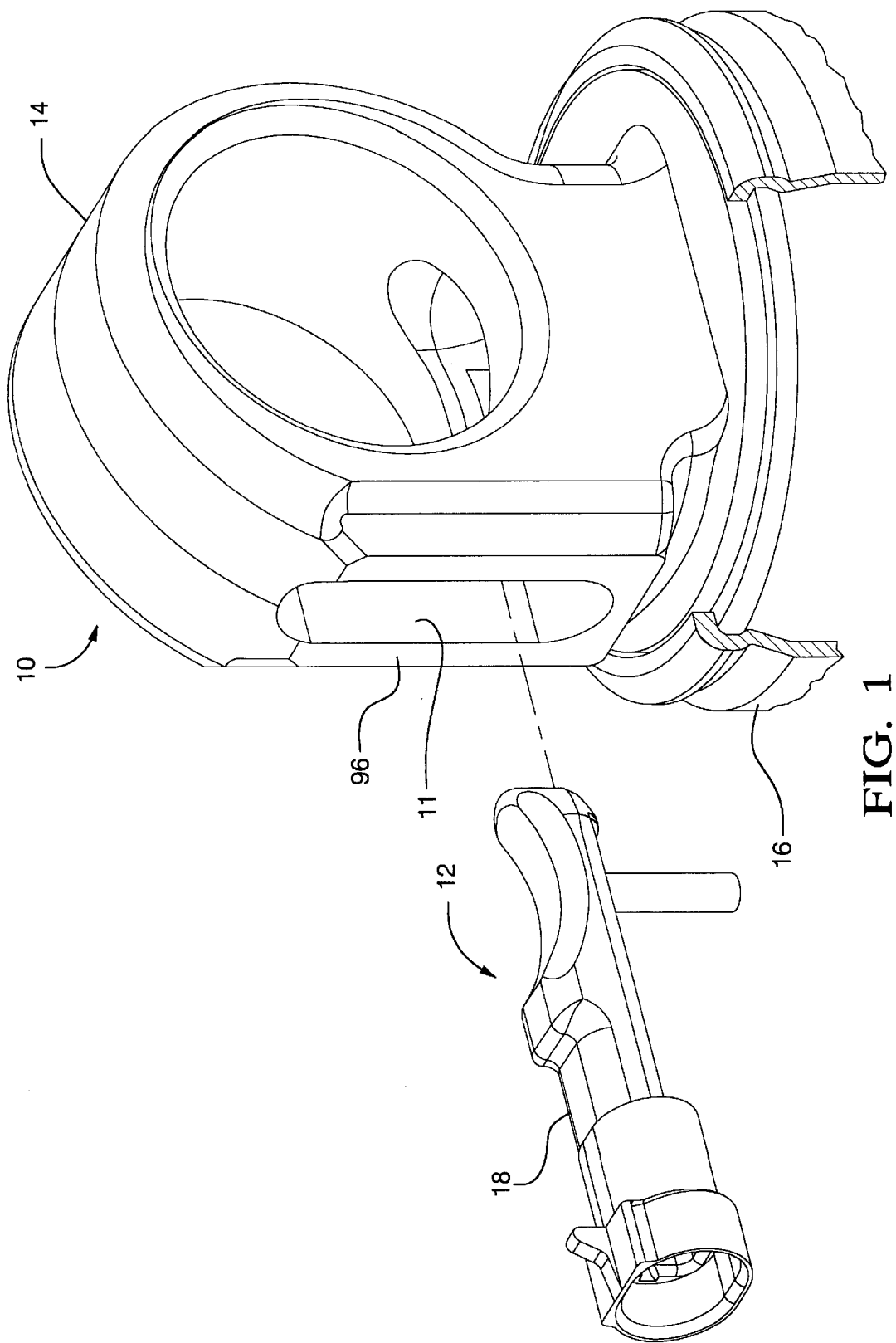
FIG. 1 illustrates a damper and electrical connection system according to the present invention including an electrical connector and a damper having a slotted ring mount.

FIG. 1 illustrates a damper 10 and electrical connector 12 according to the present invention. The electrical connector 12 is utilized to provide power and ground to the damper 10. The damper 10 includes an element requiring electrical power, such as a solenoid for selective control of the damper. A damper having an electrically powered solenoid is described in Kruckemeyer et al, U.S. Pat. No. 5,690,195 entitled "Alternating State Pressure Regulation Valved Damper" issued Nov. 25, 1997, the disclosure of which is hereby incorporated by reference. Alternatively, the damper 10 may include other elements requiring electrical power to operate such as elements to activate electrorheological or magnetorheological fluids, or any other feature requiring electrical power. Electrical power is supplied by the electrical connector 12 that extends through a slot 11 formed in the a ring mount 14 that is attached to a dust cover 16 of the damper 10. The electrical connector 12 includes an insulative body portion 18 which carries a power terminal and ground terminal as will be described hereafter.

Referring now to FIGS. 2–3, a barrel terminal assembly is provided to be carried in the insulative body portion 18 of the electrical connector 12. The barrel terminal assembly includes a female barrel terminal 20 having a barrel portion 22 having an open end 24 for receiving an electrode in the damper as will be described hereafter. A crimped insulation stop 27 is provided adjacent the barrel portion 22 to prevent plastic from flowing into the barrel during the molding operation of the insulative body of the connector. A second end 26 of the female barrel terminal includes crimp wings 28 for receiving an unplated end 30 of a dog leg shaped male blade 32. The other end 34 of the male blade 32 is tapered and mates to a female connector 72 (FIG. 8) on a chassis harness.

As will be appreciated from FIG. 3, the unplated end 30 of the male blade 32 is inserted into the female barrel terminal so that the unplated end abuts the crimped insulation stop 27 and the crimp wings 28 are crimped onto the edges of the unplated end. The female terminal barrel 20 and the male blade 32 may be attached to each other by a variety of methods but preferably are sonic welded together.

Referring now to FIG. 4, a compression seal 36 is provided having an elongated body section 38 with a first hole 40 near one end 44. The first hole 40 has a generally rectangular shape and includes a tapered side 42 nearest the midpoint of the elongated body section 38. A portion of the ground terminal will extend through the first hole 40. A second end 46 of the compression seal 36 is generally disc shaped and has a second hole 48 extending therethrough for receiving a plastic base of a power terminal. The compression seal 36 helps to create a normal force on a ground connection and also provides a water barrier to the terminals it carries. Preferably the compression seal comprises a silicone material.

Referring now to FIG. 5, a ground terminal 50 is provided having a first exposed end 52 that is tapered and will be compressed between the compression seal 36 and a machined slot 11 in the mounting ring 14. A knurled sectioned 54 is provided immediately adjacent the exposed end 52 for better electrical contact with the mounting ring 14. The ground terminal 50 also has a dog leg configuration that is pre-bent 90 degrees generally in the middle section 56 prior to molding into the connector insulative body portion 18. A second end 58 of the ground terminal is coined and chamfered to mate with an electrical harness connector as will be described hereafter.

Referring now to FIG. 6, the ground terminal 50 and the female barrel terminal 20 are insert molded into the insulative body 18 of the electrical connector 12 and are positioned to be inserted through respective holes 40, 48 in the compression seal 36. The exposed end 52 of the ground terminal is inserted through the hole 40 in the compression seal and the barrel portion 22 of the female power terminal is snugly inserted through the second hole 48 of the disc shaped end 46.

Referring to FIGS. 7–8, the completed connector 12 includes an elongated insulative body portion 18. Both an end of the ground terminal 50 and an end of the power terminal 20 extend downwardly in a generally perpendicular direction to the longitudinal axis of the elongated insulative body portion 18. The exposed end 52 of the ground terminal will be bent upward (as shown in FIG. 7) to be generally parallel with a longitudinal axis of the insulative body 18 of the electrical connector 12 and so that the exposed end 52 of the ground terminal will make contact with the ring mounting element 14 when the electrical connector 12 is inserted into the slot 11 of the ring mounting element 14. A contoured portion 64 of the upper surface of the insulative body 18 has an arcuate or sickle shape for mating with a ring sleeve that will be pressed into the ring mounting element 14 as described hereafter. A plastic cover 66 is formed over a portion of the female barrel 22 to electrically isolate the barrel portion from the piston rod. A socket end 68 is provided in the electrical connector for mating with a female connector assembly and is constructed and arranged to expose the ends 58 and 34 of the ground terminal 50 and power terminal 20. A ramped lock nub 70 is provided on the elongated body portion adjacent the socket end 68 for mating with a locking feature of the female harness connector assembly.

Referring now to FIG. 8, the electrical connector 12 mates with a harness connector assembly 72 which includes a locking feature 74 mateable with the ramped lock nub 70 on the electrical connector. The harness connector assembly 72 includes a projection 71 carrying female terminals each mateable with one of the ground 50 and power terminal 20. The projection 71 is inserted into the socket end 68 of the electrical connector and preferably a rubber like seal 76 surrounds the projection 71 and engages the inside walls of the shroud 78 defining the socket end 68 of the electrical connector. A wire (not shown) is attached to the harness connector assembly 72 and to an electrical power source for supplying electricity to the element in the damper requiring electrical power.

Figure 9:
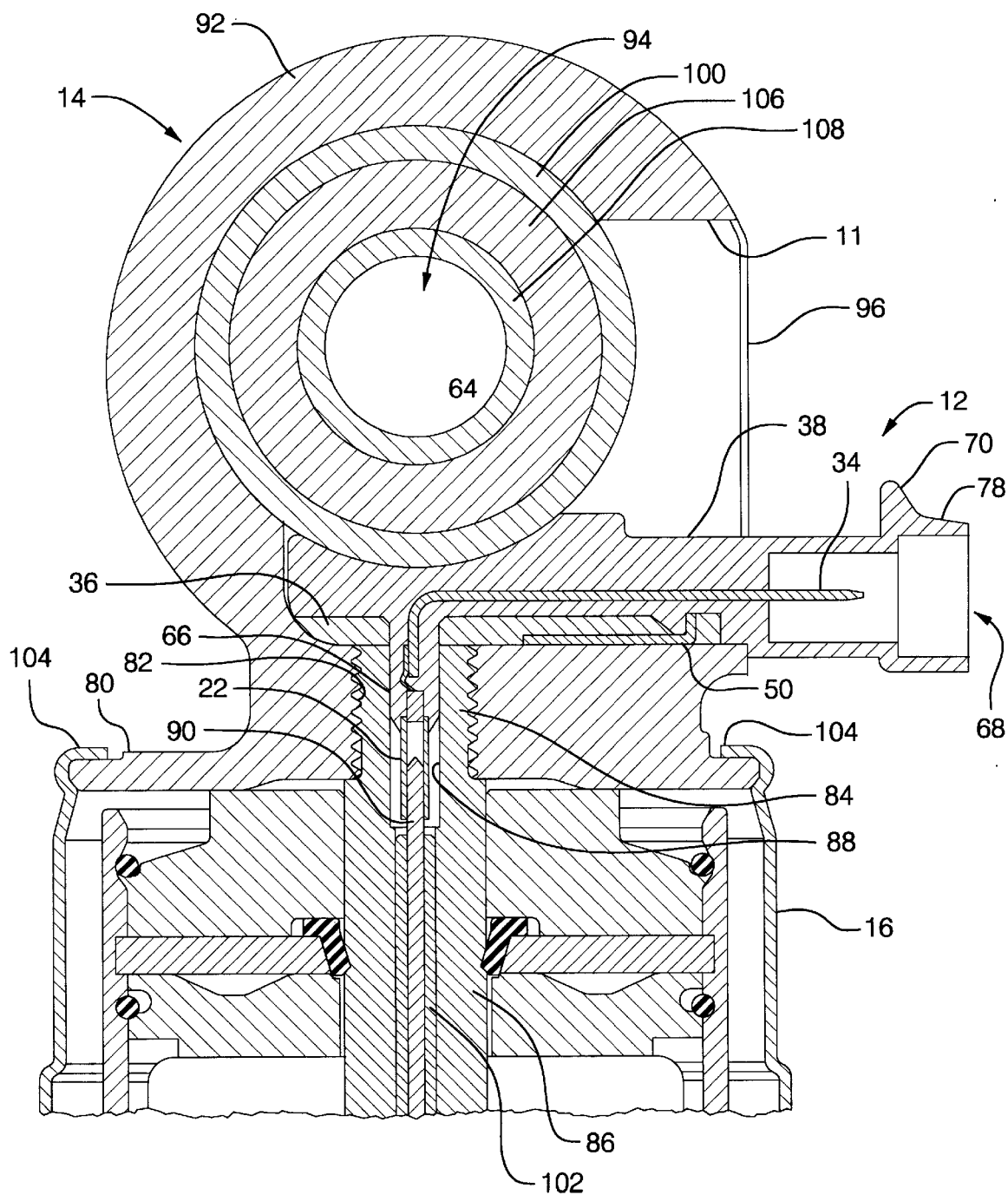
FIG. 9 is a sectional, fragmented view of an assembled damper and electrical connector of FIG. 1.

Referring now to FIG. 9, the ring mounting element 14 includes a base portion 80 having a threaded hole 82 formed generally in the center thereof and communicating with an interior chamber of the damper. The ring mounting element 14 includes a ring structure 92 attached to the base portion 80. The ring structure 92 has a hole 94 extending therethrough for receiving a mounting rod connected to the body of a vehicle. The ring structure 92 also has an elongated side 96 (better seen in FIG. 1) with a slot 11 extending therethrough and communicating with the hole 94. A piston rod 86 is carried in the damper and has a bore 88 formed therein. An electrode 90 is received in the bore 88 and includes an insulative sleeve 102 over a portion thereof to insulate the electrode 90 from the piston rod 86. The electrode 90 is connected to an element requiring electrical power such as a solenoid to control the damping of the shock absorber.

The ring mounting element 14 is threaded onto a threaded end 84 of a piston rod 86 carried in the damper. In the embodiment shown in FIG. 9, an upper end 104 of the cylindrical dust cover 16 is then crimped over the base portion 80 of the mounting ring 14 securing the same thereto. Thereafter, one end of the electrical connector 12 is inserted into the slot 11 so that the barrel 22 of the power terminal receives the electrode 90 carried in the piston rod 86 and the ground terminal 50 engages the ring mounting element 14 along one of the surfaces defining the slot 11. To insure complete electrical connection, a ring sleeve 100 is pressed into the ring mounting element 14 so that it engages the contoured (arcuate) surface 64 of the electrical connector 12 forcing the barrel 22 down on the electrode 90 and so that the ground terminal 50 makes good electrical contact with the ring mounting element 14. Rubber bushing 106 or metal sleeve 108 may be inserted into the ring sleeve 100 prior to inserting a vehicle mounting rod.

We claim:

1. A product comprising:
    a piston rod carried in a damper, the piston rod having a bore formed therein and an electrode carried in the bore, the electrode being electrically insulated from the piston rod, and an element requiring electrical power carried in the damper and connected to the electrode,
    a ring mounting element connected to the damper and having a hole formed therethrough communicating with an internal chamber of the damper, the ring mounting element including an elongated ring structure constructed and arranged to receive a mounting rod therethrough for securing the product to a vehicle, the elongated ring element having a slot extending through a side and communicating with the hole, an electrical connector for supplying electrical power to the electrode and the attached element requiring electrical power, the electrical connector having a portion extending through the slot, the electrical connector having an insulative body portion and a power terminal having a portion secured in the insulative body portion, the power terminal having a first end extending outwardly from the body portion for connection to an electrical harness and a second end extending outwardly from the insulative body portion and through the hole and connected to the electrode.

2. A product as set forth in claim 1 wherein the power terminal further comprises a barrel formed at one end for receiving the electrode and a plastic sleeve covering a portion of the barrel to electrically insulate the barrel from the piston rod.

3. A product as set forth in claim 1 wherein the element requiring electrical power is a solenoid attached to the piston rod.

4. A product as set forth in claim 1 wherein the electrical connector includes an elongated insulative body portion having a section with an arcuate shape and further comprising a ring sleeve inserted into the ring mounting element to engage the arcuate shaped surface so that the barrel portion firmly engages the electrode and so that the electrical connector is in a fixed relationship with the ring mounting element.

5. A product as set forth in claim 4 further comprising a ground terminal having a portion received in the insulative body portion and a portion extending outwardly therefrom for engagement with the ring mounting element.

6. A product as set forth in claim 1 wherein the power terminal includes a dog leg shaped male blade portion secured at one end of a barrel terminal portion, the barrel terminal portion having a barrel formed at one end for receiving the electrode and crimp wings at another for engaging the male blade, and wherein the barrel terminal portion further includes a plastic stop for preventing plastic from entering the barrel portion when a power terminal is insert molded into an insulative connector body.

7. A product as set forth in claim 6 wherein the dog leg shaped male blade portion and the barrel terminal portion are sonic welded together.

8. A product as set forth in claim 6 wherein the insulative body portion has a socket formed at one end, and the electrical connector further comprising a ground terminal having a portion received in the insulative body portion and one end extending outwardly therefrom at the socket end and a second end extending outwardly from the insulative body portion for engagement with the ring mounting element.

9. A product as set forth in claim 1 wherein the electrical connector is made from a subassembly comprising a power terminal, a ground terminal, and an elongated compression seal, and wherein a first end of the power terminal extends through a first hole formed in the compression seal and a first end of the ground terminal extends through the second hole in the compression seal and so that the first end of both the power terminal and ground terminal extend downwardly generally perpendicular to the longitudinal axis of the elongated compression seal.

10. A product as set forth in claim 9 wherein the first end of the ground terminal includes a knurled portion for better electrical contact with the ring mounting element.

11. A product as set forth in claim 9 wherein the second hole in the compression seal is defined in part by a tapered surface constructed and arranged so that the first end of the ground terminal may be bent upwardly to a positioned generally parallel to the longitudinal axis of the elongated compression seal.

12. A product comprising:
a damper carrying an element requiring electrical power, a ring mount attached to the damper and having a base with a hole extending therethrough so that the hole communicates with an interior chamber of the damper, the ring mount having a ring element with an elongated side and a slot extending through the side so that the slot communicates with the hole, and wherein the ring mount is constructed and arranged to receive a mounting rod for connection to a body of a vehicle,
an electrical connector having an insulative body portion, and an electrical power terminal having a portion carried by the insulative body portion and having a first end extending outwardly from the insulative body portion for connection to a wire harness and a second end extending through the hole in the ring mount and coupled to the element requiring electrical power carried in the housing.

13. A product as set forth in claim 12 wherein the insulative body portion includes a sickle shaped surface, and further comprising a ring sleeve inserted into the ring mount and firmly engaging the sickle shaped surface to hold the electrical connector in a fixed relationship with the ring mount.

14. A product comprising:
a damper carrying an element requiring electrical power, a ring mount attached to the damper and having a hole extending therethrough so that the hole communicates with an interior chamber of the damper, the ring mount having a ring element having a side and a slot extending through the side so that the slot communicates with the hole, and wherein the ring mount is constructed and arranged to receive a mounting rod for connecting a product to a body of a vehicle.

15. A product as set forth in claim 14 further comprising an electrical connection extending through the slot in the ring mount and connected to the element requiring electrical power to operate.

16. A product as set forth in claim 14 wherein the damper further comprises a piston rod have a bore therethrough and an electrode carried in the bore and electrically insulated from the piston rod, and an electrical connection extending through the slot formed in the ring mount and connected to the electrode.

17. A product as set forth in claim 16 for the damper further comprises a solenoid electrically connected to the electrode.

* * * * *